United States Patent

[11] 3,542,077

[72] Inventor Richard W. Muchmore
        Redwood City, California
[21] Appl. No. 731,200
[22] Filed May 22, 1968
[45] Patented Nov. 24, 1970
[73] Assignee Raychem Corporation
        Menlo Park, California
        a corporation of California

[54] DIFFERENTIALLY CROSS-LINKED ARTICLE AND
    PROCESS FOR MAKING THE SAME
    8 Claims, 9 Drawing Figs.
[52] U.S. Cl. .................................................. 138/99,
        138/170, 138/178, 161/39, 161/40, 161/139,
        161/166
[51] Int. Cl. ............................................... F16l 11/00
[50] Field of Search ........................................ 138/178,
        172, 174, 99, 170; 161/39, 40, 139, 166, 213, 216

[56] References Cited
    UNITED STATES PATENTS
3,189,509  6/1965  Needham .................... 161/39
3,199,541  8/1965  Richitelli .................... 138/129
3,379,218  4/1968  Conde ........................ 138/99
3,455,336  7/1969  Ellis .......................... 138/99
3,455,337  7/1969  Cook ......................... 138/178

Primary Examiner—Henry S. Jaudon
Attorney—Lyon & Lyon

ABSTRACT: A differentially cross-linked polymeric article having an insert embedded therein, the article on one side of the insert containing sufficient cross-linked density to be substantially infusible and on the other side of the insert being substantially fusible and noncross-linked. The article is fabricated by extruding, molding or otherwise positioning the insert within a polymeric material and then cross-linking the material on the one side of the insert, the insert preventing cross-linking of the material on the other side. The article may then be imparted with the property of elastic memory so as to render it heat recoverable. Several specific embodiments of such an article are disclosed.

Patented Nov. 24, 1970
3,542,077
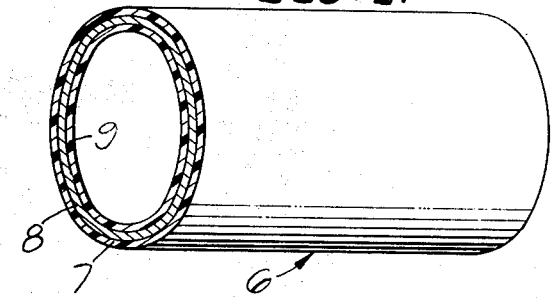
FIG. 1.
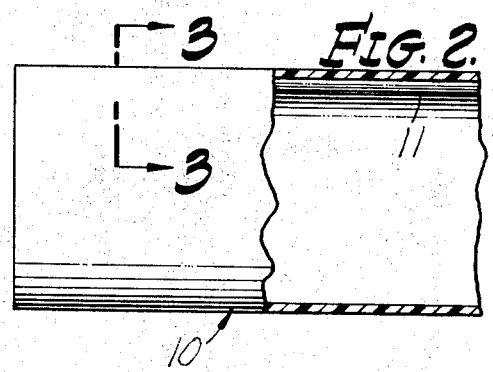
FIG. 2.
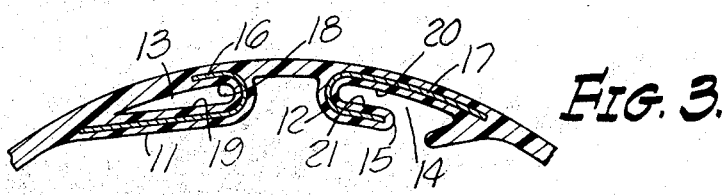
FIG. 3.
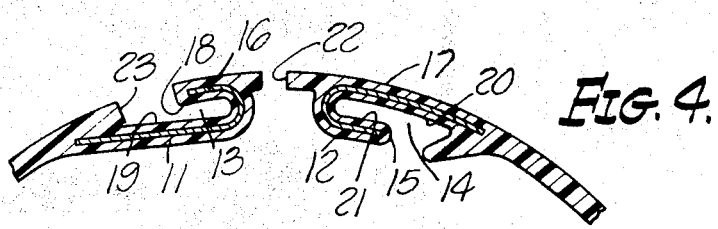
FIG. 4.
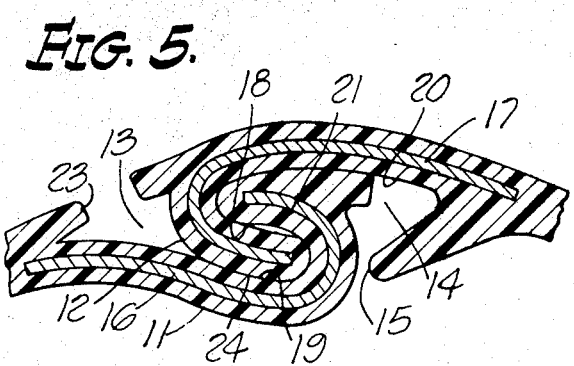
FIG. 5.
FIG. 6.
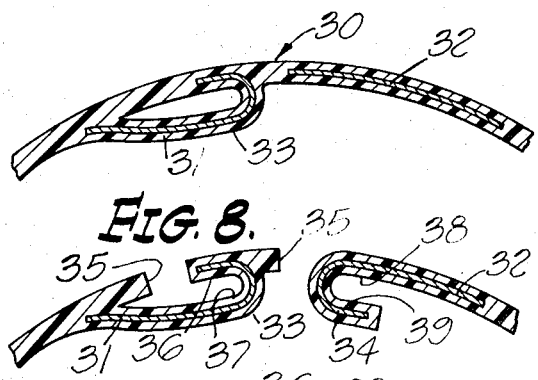
FIG. 7.
FIG. 8.
FIG. 9.
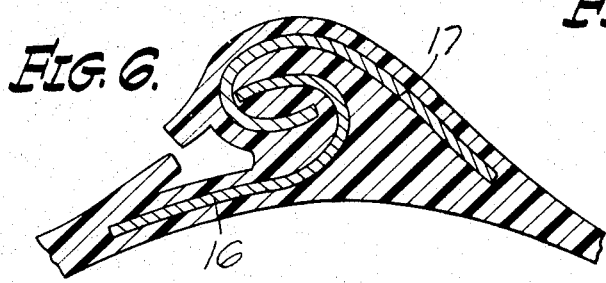
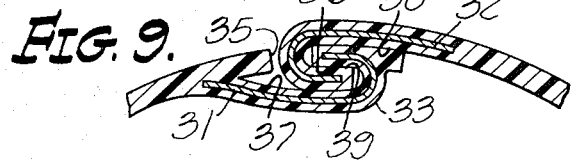
INVENTOR.
RICHARD W. MUCHMORE
BY Lyon+Lyon
ATTORNEYS

DIFFERENTIALLY CROSS-LINKED ARTICLE AND PROCESS FOR MAKING THE SAME

BACKGROUND OF THE INVENTION

In U.S. Pat. application Ser. No. 590,488, now U.S. Pat. Ser. No. 3,455,337, filed Oct. 31, 1966 by Paul M. Cook and entitled "Irradiated Article", there is disclosed a differentially cross-linked polymeric tubing capable of having the property of elastic memory imparted to it and the process for forming the same. According to the Cook application, the disclosure of which is incorporated by reference herein, a differentially cross-linked article, that is, one which has a first portion containing sufficient cross-link density to be substantially infusible and a second portion which is substantially fusible and noncross-linked, can be fabricated by irradiating the article in a manner such that the outer portion absorbs substantially all of the total incident radiation while the inner portion remains essentially unaffected. Among the factors to be considered in achieving the differential cross-linking are the nature of the material of the article and its thickness and the energy level and type of irradiating source used. As disclosed in the Cook application, the irradiation source can be modified by wrapping the article to be irradiated in aluminum foil of calculated thickness to reduce the maximum energy of the electrons of an electron beam.

SUMMARY OF THE INVENTION

According to the present invention, another method is provided for producing a differentially cross-linked polymeric article. Instead of depending on the properties of the polymeric material itself, or on a shielding introduced between the material and the irradiating source, an insert is embedded within the polymeric material and serves to prevent the portion of the article which it overlies from being cross-linked when the article is irradiated or otherwise treated. The resulting article has a substantially infusible portion and a substantially fusible portion, the line of demarcation between the portions being marked by the insert. The insert in addition may serve a function completely unrelated to its shielding function, for example, as a reinforcing member for the article. In the main, this description will be directed to a process and resulting article where the cross-linking is accomplished by irradiation. It should be understood, however, that this is for purposes of illustration only and that other methods of cross-linking fall within the scope of the invention.

A particular example where such an insert serves a function above and beyond its shielding function is in the fabrication of a heat recoverable closure system. Other types of such closure systems are disclosed in U.S. Pat. application Ser. No. 475,742, now U.S. Pat. Ser. No. 3,379,218, filed June 29, 1965 by Julian S. Conde and entitled "Closure Sleeve for Pipes or the Like", and Ser. No. 506,161, now U.S. Pat. Ser. No. 3,455,336, filed Nov. 3, 1965 by Roger H. Ellis and entitled "Heat Recoverable Article and Process", the disclosures of these applications being incorporated by reference herein. In each of these applications, a longitudinally split heat recoverable member is provided with mechanical means for fastening the split edges of the sleeve together and maintaining them in that relationship during and after heat recovery of the member. While the constructions disclosed in these applications have been found to be generally satisfactory, they each require the use of an adhesive or sealing compound to form a seal where the edges of the sleeve overlap in order to assure a completely sealed closure.

According to the present invention, a closure member is provided in which the inserts are, or may be made, hook-shaped so that they can be used to interconnect the edges of the sleeve after it has been longitudinally split. The inserts also serve to shield portions of the member from irradiation, so that these portions are not cross-linked and are fusible at the heat recovery temperature of the sleeve. Consequently, these portions being fusible and subject to the recovery forces, fuse under pressure and heat and form a seal along the length of the sleeve during heat recovery thereof.

It is accordingly an object of the present invention to provide a polymeric article having an insert therein and being on one side of the insert substantially infusible and on the other side of the insert substantially fusible.

It is also an object of the present invention to provide a method for fabricating such an article.

It is another object of the present invention to provide a heat recoverable member which may be formed into a closed tubular member and heat recovered while maintaining its tubular shape.

It is another object of the present invention to provide such a method wherein sealing is accomplished without the use of any external sealing material.

These and other objects and advantages of the present invention will become more apparent upon reference to the accompanying description and drawings in which:

BRIEF DESCRIPTION OF THE DRAWINGS

FIG. 1 is a perspective view, partly in section, of a polymeric article according to the present invention;

FIG. 2 is a side elevation view, partly in section, of a heat recoverable article according to the present invention;

FIG. 3 is a cross-sectional view taken along lines 3—3 of FIG. 2;

FIG. 4 is a cross-sectional view showing the article of FIG. 2 after various cutting operations have been performed;

FIG. 5 shows the relationship of the edges of the article after a mechanical interconnection has been made;

FIG. 6 shows in cross section the interconnection after the article has been heat recovered; and FIGS. 7, 8 and 9 are cross-sectional views showing another modification of the closure system according to the present invention.

DESCRIPTION OF THE INVENTION

In FIG. 1 there is shown a tubular member 6 constructed in accordance with the present invention. The member 6 comprises an outer portion 7, an insert 8 and an inner portion 9, the portions 7 and 9 preferably, but not necessarily being of the same polymeric material. The member 6 can be formed in any conventional manner such as molding or extruding, and if the latter is used, can be the product of a compound extrusion or may be formed by first extruding the inner portion 9, then positioning the insert 8 thereover and then extruding the portion 7 over the insert 8. The member 6 is then exposed to radiation sufficient to provide the portion 7 with a sufficient cross-link density, such that it is substantially infusible. The presence of the insert 8, which serves as a shield or irradiation attenuator, results in the portion 9 being substantially not cross-linked and substantially fusible.

The irradiation can be of various types including charged particles, i.e., beta and alpha, neutral particles, i.e., neutrons, and electromagnetic, that is, gamma, and ultraviolet. As will be obvious to those skilled in the art, the absorption behavior of these different types of irradiation in a material will vary and must be taken into account in practicing this invention. While the member 6 is shown as being tubular, it should be understood that this is illustrative only and not restrictive. The member could assume any desired shape, for example, it could simply be a flat slab of polymeric material with an insert embedded therein. It is also within the scope of the present invention to provide the shield with a lesser area than the polymeric material so that only parts of the article are differentially cross-linked.

Any polymeric material capable of being cross-linked by the various conventional treatments, such as irradiation, may be utilized in the present invention. Preferably, the polymeric material is a heat recoverable material capable of having the property of elastic memory imparted to it. Typically, heat recoverable materials include cross-linked polymers, for example, cross-linked polyolefins, such as polyethylene; cross-linked polymers, for example, cross-linked polyvinylchloride; cross-linked polyvinylidene halides; for example, cross-linked polyvinylidene fluoride; cross-linked ethylene vinyl acetate copolymers; crossdlinked ethylene ethyl acrylate copolymers; cross-linked polyamides; etc. The polymeric materials used in the practice of this invention may contain additives such as flame retarders, plasticizers, fillers and other additives familiar to those skilled in the art.

The insert 8 may be of any suitable material, either plastic or metal, that will act to sufficiently attenuate the radiation so as to prevent the cross-linking of the portion 9 of the member 6. Metals that can be used include almost any material that can be formed into a thin sheet, for example, steel, copper, bronze, aluminum, etc. Many plastics can also be used, their appropriateness being determined partially by the purpose for which the member 6 is designed, and for which the insert 8 is provided. For example, if the article is to be heat recoverable (in which case, of course, the insert cannot be complete and continuous as shown in FIG. 1) plastics that can be used include thermoset material such as epoxies, polyesters, melamines, diallyl phthalates, etc., either as filled materials or unfilled. Thermoplastic materials of high melting points such as nylon, polycarbonate, chlorinated polyether, polyphenyloxide, etc. again, either filled or unfilled, can be used with heat unstable materials of low melting points such as polyethylene, plasticized polyvinylchloride, ethylene vinyl acetate copolymers, ethylene ethyl acrylate copolymers, polyvinylidene fluoride, etc. In the case of a heat recoverable part, the insert, either metal or plastic, must be unaffected by the heat necessary to shrink the part, or affected in such small degree that it will not unduly deform when subjected to the recovery forces generated by the shrinking and pulling of the sleeve.

As will be obvious, an article constructed in accordance with the present invention will be useful in many different applications. As has already been pointed out, one such use is as a heat recoverable closure member for pipes or the like. A first embodiment of such a closure member is shown in FIGS. 2 through 6, while a second embodiment is shown in FIGS. 7 through 9.

In the embodiment shown in FIGS. 2 through 6, a sleeve 10 is extruded, molded or otherwise formed with a pair of internal loops 11 and 12 forming a pair of openings 13 and 14. The loop 11 is continuous, while the loop 12 is formed with a gap 15. Each of the loops 11 and 12 is provided with inserts in the nature of interconnecting members or hooks 16 and 17 that are sufficiently strong to withstand the shrinkage forces exerted during heat recovery and that are unaffected by the heat necessary to shrink the part or at least affected in such small degree that they will not unduly deform when subjected to heat and the recovery forces. The inserts 16 and 17 are preferably flexible enough so that they can be flexed in the longitudinal direction sufficiently to permit the sleeve 10 to be positioned over an irregular article, for example, a curved piece of pipe. These inserts may be constructed of the materials specified above.

After the sleeve 10 with its inserts 16 and 17 have been formed, it is irradiated as discussed above. The inserts 16 and 17 must be unaffected or not substantially affected by the irradiation process, and preferably, are of such thickness that they will attenuate the radiation so that the material on the inner surfaces of the loops at 11 and 12, namely, the surfaces 18 and 19 of the loop 11 and the surfaces 20 and 21 of the loop 12 are not cross-linked and are substantially fusible while the remaining areas of the sleeve 10 are cross-linked to a density to render them substantially infusible.

Once the sleeve 10 has been differentially cross-linked, it is capable of having the property of heat recoverability imparted to it. This can be accomplished by several techniques. In one way, the differentially cross-linked tube can be heated by radiant heat, hot fluids or other means, and then subjected to a differential pressure between the inside and outside of the tubing; the amount of pressure being sufficient to cause the tube to expand in a controlled fashion. When the tube has reached the desired size and shape, it is cooled. The cooling causes the reformation of strong interchain forces such as crystallinity which sets the tubing in the expanding state since at low temperatures these forces are stronger than those due to cross-links. Reheating substantially weakens the interchain forces and the cross-link forces become dominant and the tubing recovers to its original cross-linked geometry. Alternately, the property of heat recoverability may be imparted by plastically deforming the differentially cross-linked tubing at temperatures at which the interchain forces are still appreciable to magnitude. This can be accomplished by the application of a substantial amount of pressure which can be acquired mechanically or hydraulically. The tubing will then retain this shape and can be recovered elastically by heating to a temperature above the crystalline melting point or softening range of the polymer employed, leaving the cross-links to force the tubing to assume its original cross-linked geometry. In any event, the tubing that is prepared is heat recoverable so that at any time the tubing may be shrunk to approximately its original diameter simply by the application of heat.

Preferably, the tubing is expanded in the manner disclosed in the U.S. Pat. to Cook et al. No. 3,086,242, the disclosure of which is incorporated herein by reference. The Cook et al. Pat. also discloses various materials that are particularly suitable for this purpose. In addition to the materials specified above and in the Cook et al. Pat., noncrystalline polymeric materials exhibiting the property of plastic or elastic memory, such as polyurethane, ionmers, etc., could also be used in practicing the present invention. Since the articles of the present invention can be made from material of either plastic or elastic memory, the terms "elastic memory" and "plastic memory" are used interchangeably and are intended to be mutually inclusive.

After the sleeve 10 has been expanded and cooled, it is slit along its length between the loops 11 and 12 as shown at 22 in FIG. 4. A section of the wall of sleeve 10 overlying the loop 11 is also removed to form a gap 23. If desired, this gap 23 could be formed during the molding for extrusion process. FIG. 5 shows the sleeve after the interlocking has taken place. As can be seen, the surface 19 of the loop 11 is adjacent to and in contact with surface 24 of the loop 12 while the surface 18 of the loop 11 is in contact with the surface 21 of the loop 12.

When the sleeve is heated to its heat recovery temperature, it attempts to return to its original configuration with the result that it will shrink down tightly over any object having a dimension greater than the initial dimension of the sleeve. The edges of the sleeve are prevented from being pulled apart by the recovery forces by the hooklike inserts 16 and 17 which are sufficiently strong to withstand these forces. Since the surfaces 18, 19, 21 and 24 of the loops 11 and 12 have not been cross-linked, they are substantially fusible at the recovery temperature of the sleeve with the result that they are rendered fusible by the heat and are pressed together by the recovery forces of the main body of the sleeve. This combination of heat and force fuses the surfaces, eliminating any interface and forming one continuous material. When the sleeve cools, the wall is continuous and sealed into a complete cylinder without any adhesive interface at any point. The weaknesses of an adhesive system are thereby eliminated and a truly seamless tubing made from a wrap around sleeve results. This is shown in FIG. 6.

An alternate construction of a closure sleeve according to the present invention is shown in FIGS. 7, 8 and 9. A sleeve 30 is molded, extruded or otherwise formed with inserts 31 and 32, the insert 31 being positioned within a loop 33 as was the case in the previous embodiment while the insert 32 follows the contour of the wall of the sleeve 30. The sleeve is irradiated and then expanded. The insert 32 must be of a metal or thermoset or thermoplastic material that can be formed after irradiation and expansion into a hook-shape as shown at 34 in FIG. 8 and which will retain this shape during heat recovery of the sleeve 30. As was the case in the previous embodiment, a gap 35 is formed in the portion of the sleeve 30 overlying the loop 33, so that the hook 34 can be inserted therein as shown in FIG. 9. The surfaces 36, 37, 38 and 39 would be fusible after irradiation while the remainder of the sleeve would be rendered infusible by the irradiation. When the sleeve was recovered, a continuous, seamless tubing would again be formed.

While the present invention has been discussed primarily in terms of cross-linking by irradiation, chemical cross-linking could also be used. In particular, solid state cross-linking in which a cross-linking agent, or system of cross-linking agents, is diffused into the shaped polymeric article from either the liquid or gaseous state would be appropriate to the practice of the present invention. In such a case, the insert, rather than acting as a radiation shield would act as a barrier to the diffusing cross-linking agents and would prevent the volume of the polymeric material below the insert from being cross-linked. Of course, the parameters of the diffusion would have to be controlled so that it would not be long enough to cause the diffusing agents to be able to move laterally across the undersurface of the insert and thus cross-link the polymeric material in that area. In any event, some incursions along the edge of the insert or shield would be expected, but there nevertheless would remain large areas where the polymeric material was noncross-linked and hence fusible at elevated temperatures. The diffusion of the cross-linking agents would, of course, have to be effected from only one side of the insert in order for it to act as a barrier. If the article in question was tubular such as that shown in FIG. 1, the diffusion could be accomplished by passing the tubular member after it was extruded or otherwise formed through a bath of the diffusing agent, the term "bath" being used to include the agent in either the liquid or gaseous state. Of course, the diffusing agent would be prevented from access to the interior of the tubing. If the polymeric article was in the form of a slab or the like, a suitable fixture or mask would be used to limit access of the cross-linking agent to the desired surface of the article. Examples of processes and materials that could be used for such solid state cross-linking can be found in U.S. application Ser. No. 502,413, now U.S. Pat. Ser. No. 3,386,949, filed on Oct. 22, 1965 by Edward C. Stivers entitled "Chemical Cross-linking In The Solid State" and Ser. No. 544,099, filed Apr. 21, 1966 by Norman Thorp entitled "Cross-linked Polyamides" the disclosures of which are incorporated by reference herein.

It should be understood that the inserts illustrated are only exemplary and that various other forms of inserts could be used. If desired, inserts such as those shown may be slitted partly through at intervals along their lengths to provide additional flexibility to the sleeves where the objects to be covered have irregular shapes.

The invention may be embodied in other specific forms not departing from the spirit or central characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A differentially cross-linked polymeric article having a wall, an insert embedded in said wall, said wall on one side of said insert containing sufficient cross-linked density to be substantially infusible and on the other side of said insert being substantially noncross-linked and substantially fusible.

2. A differentially irradiated, heat recoverable cross-linked polymeric article having a wall in which is embedded a radiation attenuating insert, said wall on one side of said insert containing sufficient cross-linked density to be substantially infusible and on the other side of said insert being fusible and substantially noncross-linked, said wall having the property of elastic memory.

3. A heat recoverable closure member adapted to be heat recovered onto an object comprising: a piece of material which has been dimensionally changed from an original heat stable form to an independently heat unstable form capable of moving in the direction of its original form upon the application of heat alone, said piece of material having first and second edges which can be brought together to form a tubular member; said piece of material having a first integral interconnecting means at said first edge and a second integral interconnecting means at said second edge, said first and second interconnecting means being cooperable to selectively engage or disengage said edges with one another, each of said interconnecting means including an insert embedded in said material, said insert being substantially unaffected by heat sufficient to cause heat recovery of said piece of material and capable of maintaining said edges together during heat recovery of said piece of material around said object.

4. The closure member of claim 3, wherein portions of said material at said interconnecting means are fusible at the heat recovery temperature of said material.

5. The closure member of claim 4, wherein said material is a polymer, said portions being uncross-linked and the remainder being cross-linked.

6. The closure member of claim 4, wherein said portions are located between said inserts when said interconnecting means are interconnected.

7. The closure member of claim 6, wherein said portions form a seal between said edges when said piece of material is heat recovered.

8. The closure member of claim 3, wherein said inserts are hook-shaped.